Patented Dec. 17, 1935

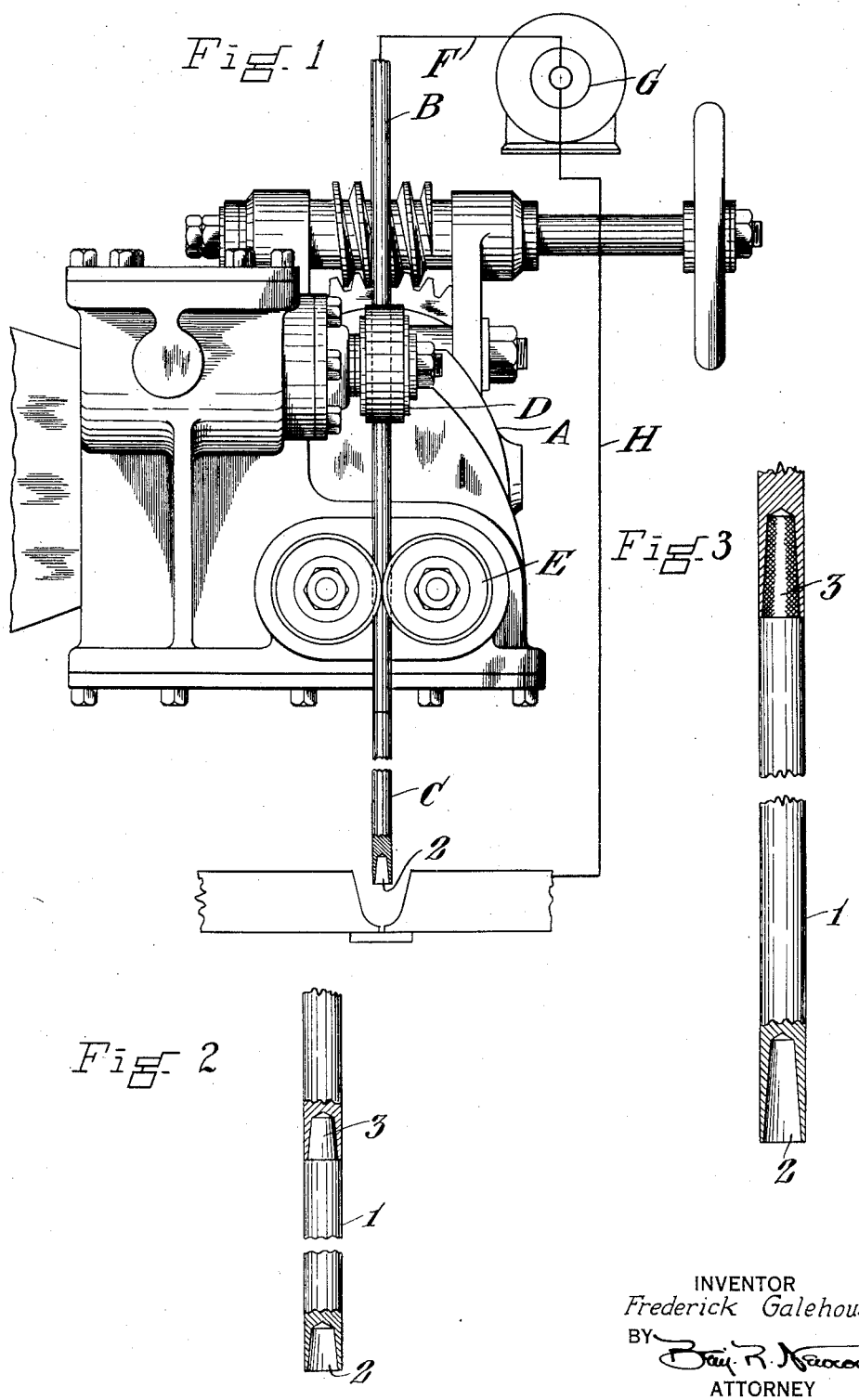

2,024,445

UNITED STATES PATENT OFFICE 2,024,445

WELDING METHOD AND MEANS

Frederick Galehouse, Boulder City, Nev., assignor to The Babcock & Wilcox Company, Newark, N. J., a corporation of New Jersey Application April 20, 1934, Serial No. 721,537

2 Claims. (Cl. 219—8)

This invention has reference to a method and means of fusion welding wherein weldrod sections are joined to one another to be inseparably and completely consumed in a continuous welding operation.

Heretofore, in joining weldrod sections, it has been customary to connect convenient lengths of say 12", 18" or 24" by threaded means in order to prevent separation, by gravity, at the joints below the feeder or holder as the weldrod is consumed, or by welding the sections together, which has its practical disadvantages.

Attempts have been made to overcome the obvious expense, complications and difficulties of both the threaded and the welded types of junction by the use of weldrod sections in which a downwardly pointing plug and recess or cup opening upwardly in adjacent rod ends are frictionally engaged, but this means, as taught and extensively practiced, has also been found unsatisfactory. The joint parts nearest the fusion area and below the feeder or holder part and the short ends below the joint fall away by gravity and are not only wasted but, at times, this seriously interferes with the continuity of the welding operation.

This difficulty has been diagnosed as due to the conductance of heat upward through the rod from the hot welding zone, coupled with the thermal resistance of the cup and plug joint which cause a temperature drop upward across the joint, so that the cup expands more than the plug and releases the frictional contact that previously held the two parts together.

The present invention contemplates the cheap and handy frictional joining of weldrod sections, for combination with a fusion welding device, in such a way as completely avoids the present difficulty by using the same phenomena that has heretofore caused the trouble. This is accomplished by combining and holding or feeding the same in such manner that the leading weldrod section having male and female terminals at opposite ends is disposed with the female terminal first approaching the fusion zone whereby the cup faces downward and the plug is pointing upward, and joined with another or succeeding section similarly disposed in relation to the first, and with cooperating terminals designed and proportioned for easy assembly in holding engagement, however, with a thermal resistance at the joint between the two whereby the heat conducted upward along the weldrod being consumed, causes the upward pointing plug to rise in temperature faster than its engaging downwardly pointing cup, so that the former expands more than the latter and thereby strengthens the frictional contact holding the two parts together and, accordingly, the lower end section never parts from the one above it, and welding is uninterrupted.

It will be apparent that the ability to use the short pieces previously discarded, or which dropped off and interfered with the work is of very great advantage from the standpoint of facilitating work and improving its quality as well as for economy in the consumption of expensive weldrod material.

With the foregoing in mind there is now to be described a practical method and means of practicing this present invention, in connection with the accompanying drawing illustrative thereof, and in which—

Fig. 1 is a side elevation of an automatic weldrod feeding head and weldrod sections according to the invention;

Fig. 2 is a fragmentary view of one type of weldrod section terminals, and

Fig. 3 is a similar view of another type with the male terminal knurled.

In detail—

In practicing the invention the combination may include an automatic weldrod feeding head as indicated by A in which the joined weldrod sections B and C pass between pairs of driven feeding rolls D and E, or either pair alone, for moving the weldrod into the fusion area.

The welding generator G supplies electric energy, as shown, through leads F and H to the weldrod and the work.

The weldrod sections B and C are identical and each comprises a body portion 1 between terminals 2 and 3. In the present instance bare wire is shown, but coated or covered wire is equally applicable.

Each female terminal 2 is a recess or cup of tapered form, as shown, to receive a correspondingly tapered male terminal 3 of an adjacent rod section.

The leading rod section immediately being consumed is entered into the fusion area with its female terminal foremost, as a consequence of which heat is conducted along the rod section 1 to its male terminal 3 almost immediately upon the beginning of fusion.

The interfitting male and female terminals are designed and proportioned for easy assembly in holding engagement with the cup or recess end 2 pointing downwardly and the plug or male member 3 disposed upwardly; however, the design and proportioning is such that considerable thermal resistance is embodied in the juncture between the rod sections, and the heat conducted upwardly along the weldrod section being consumed causes the upwardly pointing male terminal or plug to rise in temperature faster than its engaging downwardly pointing cup, whereby the former expands more than the latter and thereby strengthens the frictional contact holding the parts together and, accordingly, the lower end section never parts from the one above it, and the welding is thus enabled to continue uninterrupted and without fear of disjuncture of the rod sections.

The recessed end of the weldrod section with which welding is initiated also has the advantage of a thin lip which, in arc welding, assists in initiating the arc; furthermore, it is already in the form of a desirable crater and with coated or covered rods having a slowly consumed coating or covering substance this initial crater form is especially desirable in starting the electric arc process of welding.

I claim—

1. The method of feeding into a heated welding zone sectional weldrods joined by interfitting male and female terminals on adjacent ends of each section and which terminals are formed with a tolerance providing a lock joint when the male terminal is heated, and which includes the steps of progressively feeding the initial weldrod toward the welding zone with its male terminal remote from said zone and joining successive weldrod sections by always fitting the female over the male terminal whereby the heat of the welding zone is first conducted to and thereby expands the male member to increase the security of the joint as it nears the welding zone.

2. Apparatus for welding, comprising a plurality of closely interfitting plug and socket jointed sections forming a depositable weldrod electrode, the sections of which are arranged to be locked together by heat reaching the plug more freely than the socket, a receiving electrode, an arc circuit including the electrode, and means having weldrod feeding and supporting elements moving the weldrod sections in jointed relation toward the arc always with the plug of the assembled joint disposed to receive the heat of the arc along the rod in advance of the socket whereby the joint is locked by the heat of the arc before the joint passes the supporting elements of the feeding means.

FREDERICK GALEHOUSE.